(12) United States Patent
Zeng et al.

(10) Patent No.: US 10,595,371 B2
(45) Date of Patent: Mar. 17, 2020

(54) LED LIGHT APPARATUS (71) Applicant: XIAMEN ECO LIGHTING CO. LTD., Xiamen (CN)

(72) Inventors: Maojin Zeng, Xiamen (CN); Bin Zhang, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 16/221,445

(22) Filed: Dec. 14, 2018

(65) Prior Publication Data

US 2019/0191512 A1 Jun. 20, 2019

(51) Int. Cl.
*H05B 33/08* (2006.01)
*F21S 4/22* (2016.01)
*F21V 23/04* (2006.01)
*F21S 8/02* (2006.01)
*F21Y 115/10* (2016.01)
*F21V 23/00* (2015.01)

(52) U.S. Cl.
CPC ............ *H05B 33/0818* (2013.01); *F21S 4/22* (2016.01); *F21S 8/026* (2013.01); *F21V 23/04* (2013.01); *H05B 33/0863* (2013.01); *F21V 23/004* (2013.01); *F21Y 2115/10* (2016.08); *Y02B 20/346* (2013.01)

(58) Field of Classification Search
CPC .... H05B 37/02; H05B 37/029; H05B 33/086; H05B 33/0809; H05B 33/0833; H05B 33/0845; H05B 33/0815; H05B 33/0818; Y02B 20/347; F21Y 2115/10
See application file for complete search history.

(56) References Cited

U.S. PATENT DOCUMENTS

| | | | | |
|---|---|---|---|---|
| 8,390,205 B2* | 3/2013 | Li | ...................... | H05B 33/0827 315/152 |
| 8,436,550 B2* | 5/2013 | Maehara | ............ | H05B 33/0815 315/291 |
| 8,521,035 B2* | 8/2013 | Knapp | .................... | H04L 12/43 315/158 |
| 9,113,530 B2* | 8/2015 | Yagi | ...................... | H05B 33/086 |
| 9,730,282 B2* | 8/2017 | Munday | ............. | H05B 33/0803 |
| 9,967,960 B2* | 5/2018 | Bora | .................. | H05B 33/0863 |
| 10,018,776 B2* | 7/2018 | Itoh | ...................... | G02B 6/0068 |

* cited by examiner

*Primary Examiner* — Haissa Philogene
(74) *Attorney, Agent, or Firm* — Chun-Ming Shih; Lanway IPR Services (57) ABSTRACT

A LED light apparatus includes a first light source, a second light source, a PWM generator, a control signal generator and a manual switch. Users operate the manual switch to adjust a duty ratio setting of the PWM generator for adjusting a first control signal and a second control signal for controlling the first light source and the second light source to generate a desired light.

19 Claims, 8 Drawing Sheets

LED LIGHT APPARATUS

FIELD OF INVENTION

The present invention is related to a LED light apparatus and more particularly related to a LED light apparatus with variable color temperatures.

BACKGROUND

Light apparatuses are widely used in human life. With the current LED (Light Emitted Diode) technologies, light apparatuses have much better power efficiency and stability compared with past light technology.

Nevertheless, light source is critical to provide living quality of an environment. Specifically, for different applications and different environment, different light requirements may be needed to optimize the light performance. Therefore, it is always important and helpful to discover new needs and find a novel technology solution to solve its technical problems.

SUMMARY

According to an embodiment of the present invention, a LED light apparatus includes a first light source, a second light source, a PWM generator, a control signal generator, and a manual switch. The first light source emits a first light of a first color temperature. The second light source emits a second light of a second color temperature.

The PWM generator generates a PWM signal according to a duty ratio setting for adjusting a duty ratio of the PWM signal.

Pulse-width modulation (PWM), or pulse-duration modulation (PDM), is a way of describing a digital (binary/discrete) signal that was created through a modulation technique, which involves encoding a message into a pulsing signal. Although this modulation technique can be used to encode information for transmission, its main use is to allow the control of the power supplied to electrical devices, especially to inertial loads such as motors. In addition, PWM is one of the two principal algorithms used in photovoltaic solar battery chargers, the other being maximum power point tracking.

The average value of voltage (and current) fed to the load is controlled by turning the switch between supply and load on and off at a fast rate. The longer the switch is on compared to the off periods, the higher the total power supplied to the load.

The PWM switching frequency has to be much higher than what would affect the load (the device that uses the power), which is to say that the resultant waveform perceived by the load must be as smooth as possible. The rate (or frequency) at which the power supply must switch can vary greatly depending on load and application, for example.

Switching has to be done several times a minute in an electric stove; 120 Hz in a lamp dimmer; between a few kilohertz (kHz) and tens of kHz for a motor drive; and well into the tens or hundreds of kHz in audio amplifiers and computer power supplies.

The term duty cycle describes the proportion of 'on' time to the regular interval or 'period' of time; a low duty cycle corresponds to low power, because the power is off for most of the time. Duty cycle is expressed in percent, 100% being fully on. When a digital signal is on half of the time and off the other half of the time, the digital signal has a duty cycle of 50% and resembles a "square" wave. When a digital signal spends more time in the on state than the off state, it has a duty cycle of >50%. When a digital signal spends more time in the off state than the on state, it has a duty cycle of <50%.

The main advantage of PWM is that power loss in the switching devices is very low. When a switch is off there is practically no current, and when it is on and power is being transferred to the load, there is almost no voltage drop across the switch. Power loss, being the product of voltage and current, is thus in both cases close to zero. PWM also works well with digital controls, which, because of their on/off nature, can easily set the needed duty cycle.

The control signal generator generates a first control signal and a second control signal based on the PWM signal. Specifically, when the first control signal is in a high level, the second control signal is in a low level. When the first control signal is in the low level, the second control signal is in the high level. In other words, the first control signal and the second control signal are kept as inverted relation.

The first control signal is used for turning on the first light source when the first control signal is in the high level. The second control signal is used for turning on the second light source when the second control signal is in the high level.

The control signal generator may be made of transistor gate circuits for turning on or turning off by reference to the PWM signal. Inverter or related circuit components may be used for invert the PWM signal while generating the first control signal and the second control signal.

The manual switch is disposed for a user to operate to change the duty ratio setting of the PWM generator for adjusting a mixed color temperature. The manual switch may be configured by a manufacturer during manufacturing or configured by an end user while using the LED light apparatus.

In some embodiments, the first light source and the second light source are placed in the same light source plate. For example, a circular plate may be used for mounting both the first light source and the second light source. To get better mixing effect, the first light source and the second light source may be arranged alternatively or in parallel. Wires may be disposed on the light source plate. The first light source and the second light source may be implemented as elongated strips to emulate the appearance of traditional incandescent light. In such case, the first light source and the second light source may be disposed on an elongated substrate, e.g. in parallel to each other. The substrate may be a rigid substrate or a flexible substrate. When the substrate is a flexible substrate, the first light source and the second light source may be adjusted for their light covering angles in a three-dimension space.

In some embodiments, the manual switch is a mechanical switch with multiple positions corresponding to multiple duty ratio settings to be selected by a user.

For example, there may be five positions to be selected corresponding to five different duty ratio settings.

In some embodiments, the mechanical switch is a wheel switch. Specifically, a rotatable wheel for users to rotate to select a desired mixed color temperature.

In some embodiments, the mechanical switch is a button for sequentially changing to a different duty ratio setting click by click. Specifically, each time when users press the button, a new work ratio setting is selected in a predetermined sequence.

In some embodiments, the manual switch may be a touch panel or any electronic style switch connecting to the PWM generator.

In some embodiments, the LED light apparatus also includes a bulb cap. The manual switch is disposed to a surface of the bulb cap. Specifically, in such case, the LED light apparatus is a light bulb. The manual switch is exposed on the surface of the bulb cap, i.e. the bottom side for connecting to a bulb socket while still having a portion exposed to a user to operate the manual switch.

In some embodiments, the manual switch is a variable resistor supplying different resistance values corresponding to different duty ratio settings. Certain electronic components like capacitors, resistors may be added for supplying a status of the manual switch to the PWM generator.

In some embodiments, the PWM generator and the control signal generator are integrated in an integrated circuit chip. Specifically, other circuits like current generator may be added in the integrated circuit chip, too. In some other embodiments, these circuit components may be distributed in multiple integrated circuit chips.

In some embodiments, the first control signal is set in the high level and the second control signal is set in the low level when the PWM signal is set in the high level.

In some embodiments, when the first control signal is in the high level, the first light source is turned on by supplying a first current, and when the second control signal is in the high level, the second light source is turned on by supplying a second current.

The first current and the second current may have substantially the same value. Specifically, a current source supplies current to both the first light source and the second light source. As explained above, the first light source and the second light source may be controlled so as not turned on at the same time, the same current source may just supply the same current, just alternatively supplying to the first light source and the second light source.

In some embodiments, a current source is added to the LED light apparatus for alternatively supplying the first current and the second current to the first light source and the second light source respectively.

In some embodiments, the first current and the second current are adjustable by a second switch. In other words, the duty ratio is used for adjusting an overall mixed color temperature. In a more complicated design, the first current and the second current may be further adjusted for changing an overall luminous level of the LED light apparatus.

In some embodiments, the high level and the low level correspond to a high voltage level and a low voltage level respectively.

In some other embodiments, the high level and the low level correspond to a low voltage level and a high voltage level respectively.

In other words, the function mapping between the PWM signal, the first control signal and the second control signal may be chosen depending on different design needs.

In some embodiments, the LED light apparatus may also include a downlight housing. The first light source and the second light source are disposed in the downlight housing. The manual switch is disposed on a back side of the downlight housing facing to a ceiling.

In some embodiments, the LED light apparatus may also include a third light source with a third color temperature. The first light source, the second light source and the third light source together generate a mixed color temperature. For example, the third light source may be turned on or turned off, but not directly related to the first control signal or the second control signal. The third light source may be turned on always as a basic light source mixed with the first light source and the second light source to generate a desired color temperature and luminous level.

The present invention provides various embodiments of adjustable light apparatuses. In first embodiment, an adjustable light apparatus includes a first light source, a second light source, a control circuit and a tuning circuit. The first light source and the second light source have different optical characteristic. For example, the first light source and the second light source have different color temperatures. The control circuit is coupled to the first light source and the second light source to separately turning on or turning off the first light source and the second light source according to control signals supplied by the tuning circuit.

Specifically, the control circuit is coupled to the first light source and the second light source. The control circuit has a first control gate and a second control gate respectively connected to a first power source and a second power source. The first power source supplies power to the first light source when the first control gate is turned on. The second power source supplies power to the second light source when the second control gate is turned on. The tuning circuit have multiple settings corresponding to different duty cycles for turning on and turning off the first control gate and the second control gate to generate different mixing optical characteristic of the first light source and the second light source.

Please be noted that the first power source and the second power source may be two distinct power sources but may also refer to two parts of one physical power source. In addition, the first power source and the second power source may even be referred to the same power source. In one embodiment, for example, the first light source and the second light source are not turned on at the same time. In other words, for any moment, only one light source is turned on and therefore a single power source may be used as the first power source and the second power source alternatingly.

In one embodiment, the first light source and the second light source are LED (Light Emitted Diode) modules, e.g. a LED chip or a module with multiple LED chips. The first light source and second light source may have different color temperatures. By adjusting the turn-on to turn-off ratio of the first light source corresponding to the second light source therefore may change the visual effect of mixing color temperature. Color mixing may also be used with the technical solutions mentioned in this disclosure.

In one embodiments, the first light source and the second light source respectively have multiple LED modules arranged with an interlaced pattern to each other so that when the first light source and the second light source may provide a more stable mixing effect.

In one embodiment, the first control gate and the second control gate are MOSFET switches respectively receiving a first control signal and a second control signal from the tuning circuit to turn on or to turn off the first light source and the second light source.

In one embodiment, when the first light source is turned on, the second light source is turned off. In addition, when the second light source is turned on the first light source is turned off.

In one embodiment, the first control signal and the second control signal are PWM (Pulse Width Modulation) signals provided by the tuning circuit. PWM, or pulse-duration modulation (PDM), is a modulation technique used to encode a message into a pulsing signal. The PWM signal is a series of pulses. For each pulse (i.e., each period or cycle), the pulse includes a portion of "high" signal and a portion of "low" signal. In one embodiment, the time period may be ¹⁄₁₀₀₀ second between two consecutive high levels of the PWM signal.

In PWM case, the first control signal may refer the high level as turn-on while the second control signal may refer the low level as turn-on. In addition, the first control signal may refer the low level as turn-off while the second control signal may refer the high level as turn-off. By disposing an inverter or related circuit, the first control signal and the second control signal may have the same signal source, e.g. a PWM signal. Please be noted, however, such configuration is only one of the methods to implement the present invention and therefore, the present invention is not limited by such implementation.

In one embodiment, there are more than three settings, each setting corresponding to a different duty cycle with different turn-on by turn-off ratios for the first control signal and the second control signal. For example, the tuning circuit has a switch selectively connected to one of five resistors to construct one of five selective electrical signal values to generate a corresponding PWM signal from five options to control the first light source and the second light source. In such example, there are five settings, which means the first light source and the second light source may be controlled to generate five different optical characteristics, e.g. five different color temperatures.

In some other embodiments, the tuning of the setting may be continuous, instead of selection from several discrete options. For example, a dimmer, e.g. along with an adjustable resistor, may be used to generate a corresponding voltage provided to a PWM generator to generate an associated PWM signal over a continuous range.

In one embodiment, the adjustable light apparatus may include an operation switch sending a tuning operation of a user to the tuning circuit to change the mixing optical characteristic of the first light source and the second light source. For example, a dimmer that is operable by a user may be used to select a setting, and the dimmer, like a rotatable button, may be connected to the tuning circuit to change the setting of driving the first light source and the second light source.

In addition to the first light source and the second light source, in other embodiments, there may be other light sources disposed. For example, a third light source, or even more, may be disposed along with the first light source and the second light source. In such case, the first light source, the second light source, and the third light source may have different color temperatures. Under different settings, the first light source, the second light source and the third light source may be turned sequentially with different time period ratios to generate a different overall color temperature.

In one embodiment, the adjustable light apparatus has a downlight housing for disposing the first light source, the second light source, the control circuit and the tuning circuit. Such downlight housing may include a reflector, a heat sink, a driver circuit, and other corresponding components to be installed on a ceiling cavity. On such housing, there may be a mechanic switch, e.g. an adjustable lever, for a user to slide to set a corresponding setting for generating a different optical characteristic, e.g. a different color temperature. Such mechanic switch may be combined with associated components to instruct the tuning circuit to change the settings of the tuning circuit.

In one embodiment, the adjustable light apparatus has a wireless circuit connected to the tuning circuit for receiving a control instruction from an external device to change the setting of the tuning circuit. For example, a user may use a Wi-Fi device or a Bluetooth device on a mobile phone to send a control signal to the wireless circuit of the adjustable light apparatus to control the tuning circuit to change a desired setting to get a desired overall optical characteristic of the adjustable light apparatus.

In one embodiment, the tuning circuit and the control circuit are integrated in an integrated chip mounted on a circuit board connected to a heat sink. These circuits may generate massive heat and such arrangement may help lengthen the life span and increase system liability.

As mentioned above, there may be more than one optical characteristic to be mixed. For example, the optical characteristic may include color spectrum distribution. In other words, the first light source and the second light source may emit different light colors. By adjusting their turn-on and turn-off ratio may be used to generate a different color effect. In addition to color, luminance strength may also be a factor to be adjusted. For example, the first light source and the second light source may have different luminance levels, e.g. one emits brighter and consumes more power than the other. By adjusting to different settings, users may easily get the desired light effect they need.

In one embodiment, the turn-on periods of the first light source and the second light source are partially overlapped. In such case, the first light source and the second light source may have a common turn-on period instead of a strict alternating pattern. Such design may increase a better visual effect. In such design, certain capacitor may be used to store the increased power source to keep the overall power source not varying too much.

In one embodiment, there may be a time gap between turn-on periods of the first light source and the second light source. For example, when the first light source is turned off, there is a time gap before the second light source is turned on. Such time gap may help keep the power source stable, avoiding undesired peak to damage the power circuit.

In one embodiment, the settings are stored in a table of the tuning circuit and the table is adjustable. For example, the tuning circuit has a corresponding memory unit for storing optional values of the settings. A designer may change the values of the memory unit to change a different value. In such design, a common configuration may have better flexibility. For example, light apparatuses sold to different regions, having different needs and requirements, may use the same hardware settings but loaded with different setting values.

In one embodiment, the first light source and the second light source may not need to be always turned on and then turn off sequentially. For example, the first light source may be kept turned on. By changing the turn-on periods of the second light source, the overall optical characteristic, like color temperature, may still be adjusted under different settings.

In one embodiment, when one of the first light source and the second light source is damaged, the other light source may be kept turned on. In other words, the other light source may be used a redundant backup solution even when one light source is damaged. In such design, an operable switch or an automatic sensor may be used for the tuning circuit to operate under predetermined circuit logic.

DETAILED DESCRIPTION

Figure 8:
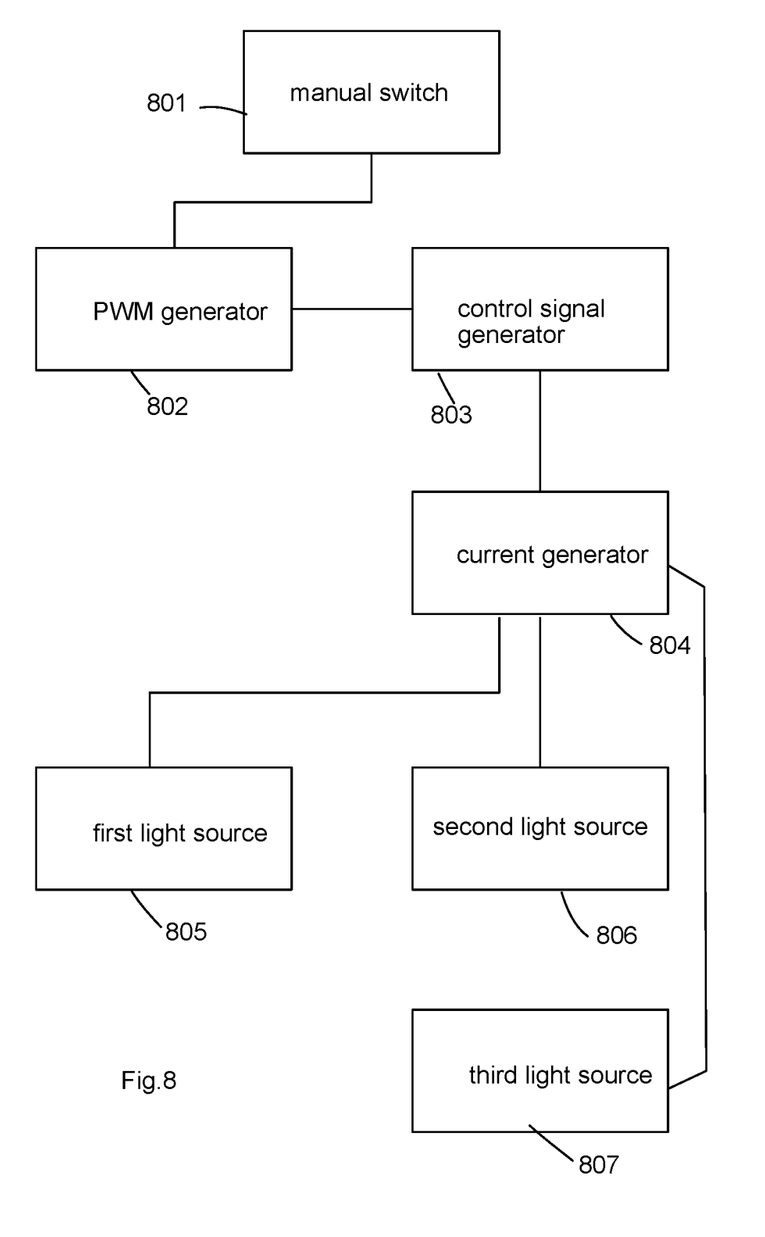
FIG. 8 illustrates a system diagram of an LED light apparatus embodiment.

Please refer to FIG. 8. FIG. 8 illustrates a system diagram of an LED light apparatus embodiment.

According to an embodiment of the present invention, a LED light apparatus includes a first light source 805, a second light source 806, a PWM generator 802, a control signal generator 803, and a manual switch 801. The first light source 805 emits a first light of a first color temperature. The second light source 806 emits a second light of a second color temperature.

The PWM generator 802 generates a PWM signal according to a duty ratio setting for adjusting a duty ratio of the PWM signal.

Pulse-width modulation (PWM), or pulse-duration modulation (PDM), is a way of describing a digital (binary/discrete) signal that was created through a modulation technique, which involves encoding a message into a pulsing signal. Although this modulation technique can be used to encode information for transmission, its main use is to allow the control of the power supplied to electrical devices, especially to inertial loads such as motors. In addition, PWM is one of the two principal algorithms used in photovoltaic solar battery chargers, the other being maximum power point tracking.

The average value of voltage (and current) fed to the load is controlled by turning the switch between supply and load on and off at a fast rate. The longer the switch is on compared to the off periods, the higher the total power supplied to the load.

The PWM switching frequency has to be much higher than what would affect the load (the device that uses the power), which is to say that the resultant waveform perceived by the load must be as smooth as possible. The rate (or frequency) at which the power supply must switch can vary greatly depending on load and application, for example.

Switching has to be done several times a minute in an electric stove; 120 Hz in a lamp dimmer; between a few kilohertz (kHz) and tens of kHz for a motor drive; and well into the tens or hundreds of kHz in audio amplifiers and computer power supplies.

The term duty cycle describes the proportion of 'on' time to the regular interval or 'period' of time; a low duty cycle corresponds to low power, because the power is off for most of the time. Duty cycle is expressed in percent, 100% being fully on. When a digital signal is on half of the time and off the other half of the time, the digital signal has a duty cycle of 50% and resembles a "square" wave. When a digital signal spends more time in the on state than the off state, it has a duty cycle of >50%. When a digital signal spends more time in the off state than the on state, it has a duty cycle of <50%.

Figures 7A, 7B, 7C:
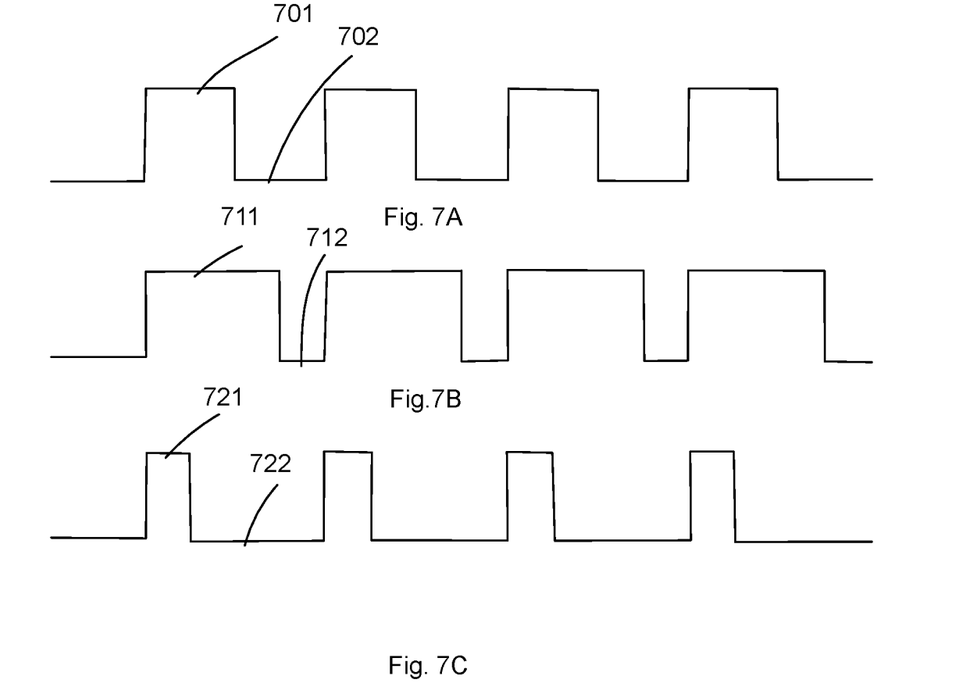
FIG. 7A illustrates a first duty ratio diagram.
FIG. 7B illustrates a second duty ratio diagram.
FIG. 7C illustrates a third duty ratio diagram.

Please refer to FIG. 7A, FIG. 7B and FIG. 7C.

In FIG. 7A, the high level 701 of "ON" status and the low level 702 of "OFF" status occupy certain time length. In FIG. 7A, the duty ratio of the high level 701 to the low level 702 is 50%.

In contrast, the high level 711 of "ON" status and the low level 712 of "OFF" status in FIG. 7B show another duty ratio configuration, e.g. as 75%.

In addition, the high level 721 of "ON" status and the low level 722 of "OFF" status in FIG. 7C show another duty ratio configuration, e.g. 25%.

The main advantage of PWM is that power loss in the switching devices is very low. When a switch is off there is practically no current, and when it is on and power is being transferred to the load, there is almost no voltage drop across the switch. Power loss, being the product of voltage and current, is thus in both cases close to zero. PWM also works well with digital controls, which, because of their on/off nature, can easily set the needed duty cycle.

The control signal generator 803 generates a first control signal and a second control signal based on the PWM signal. Specifically, when the first control signal is in a high level, the second control signal is in a low level. When the first control signal is in the low level, the second control signal is in the high level. In other words, the first control signal and the second control signal are kept as inverted relation.

The first control signal is used for turning on the first light source 805 when the first control signal is in the high level. The second control signal is used for turning on the second light source 806 when the second control signal is in the high level.

The control signal generator 803 may be made of transistor gate circuits for turning on or turning off by reference to the PWM signal. Inverter or related circuit components may be used for invert the PWM signal while generating the first control signal and the second control signal.

The manual switch 801 is disposed for a user to operate to change the duty ratio setting of the PWM generator 802 for adjusting a mixed color temperature. The manual switch 801 may be configured by a manufacturer during manufacturing or configured by an end user while using the LED light apparatus.

In some embodiments, the first light source and the second light source are placed in the same light source plate. For example, a circular plate may be used for mounting both the first light source and the second light source. To get better mixing effect, the first light source and the second light source may be arranged alternatively or in parallel. Wires may be disposed on the light source plate. The first light source and the second light source may be implemented as elongated strips to emulate the appearance of traditional incandescent light. In such case, the first light source and the second light source may be disposed on an elongated substrate, e.g. in parallel to each other. The substrate may be a rigid substrate or a flexible substrate. When the substrate is a flexible substrate, the first light source and the second light source may be adjusted for their light covering angles in a three-dimension space.

In some embodiments, the manual switch is a mechanical switch with multiple positions corresponding to multiple duty ratio settings to be selected by a user.

For example, there may be five positions to be selected corresponding to five different duty ratio settings.

In some embodiments, the mechanical switch is a wheel switch. Specifically, a rotatable wheel for users to rotate to select a desired mixed color temperature.

In some embodiments, the mechanical switch is a button for sequentially changing to a different duty ratio setting click by click. Specifically, each time when users press the button, a new work ratio setting is selected in a predetermined sequence.

In some embodiments, the manual switch may be a touch panel or any electronic style switch connecting to the PWM generator.

In some embodiments, the LED light apparatus also includes a bulb cap. The manual switch is disposed to a surface of the bulb cap. Specifically, in such case, the LED light apparatus is a light bulb. The manual switch is exposed on the surface of the bulb cap, i.e. the bottom side for connecting to a bulb socket while still having a portion exposed to a user to operate the manual switch.

In some embodiments, the manual switch is a variable resistor supplying different resistance values corresponding to different duty ratio settings. Certain electronic components like capacitors, resistors may be added for supplying a status of the manual switch to the PWM generator.

In some embodiments, the PWM generator and the control signal generator are integrated in an integrated circuit chip. Specifically, other circuits like current generator may be added in the integrated circuit chip, too. In some other embodiments, these circuit components may be distributed in multiple integrated circuit chips.

In some embodiments, the first control signal is set in the high level and the second control signal is set in the low level when the PWM signal is set in the high level.

In some embodiments, when the first control signal is in the high level, the first light source is turned on by supplying a first current, and when the second control signal is in the high level, the second light source is turned on by supplying a second current.

The first current and the second current may have substantially the same value. Specifically, a current source 804 in FIG. 8 supplies current to both the first light source and the second light source. As explained above, the first light source and the second light source may be controlled so as not turned on at the same time, the same current source may just supply the same current, just alternatively supplying to the first light source and the second light source.

In some embodiments, a current source is added to the LED light apparatus for alternatively supplying the first current and the second current to the first light source and the second light source respectively.

In some embodiments, the first current and the second current are adjustable by a second switch. In other words, the duty ratio is used for adjusting an overall mixed color temperature. In a more complicated design, the first current and the second current may be further adjusted for changing an overall luminous level of the LED light apparatus.

In some embodiments, the high level and the low level correspond to a high voltage level and a low voltage level respectively.

In some other embodiments, the high level and the low level correspond to a low voltage level and a high voltage level respectively.

In other words, the function mapping between the PWM signal, the first control signal and the second control signal may be chosen depending on different design needs.

In some embodiments, the LED light apparatus may also include a downlight housing. The first light source and the second light source are disposed in the downlight housing. The manual switch is disposed on a back side of the downlight housing facing to a ceiling.

In some embodiments, the LED light apparatus may also include a third light source 807 in FIG. 8 with a third color temperature. The first light source, the second light source and the third light source together generate a mixed color temperature. For example, the third light source may be turned on or turned off, but not directly related to the first control signal or the second control signal. The third light source may be turned on always as a basic light source mixed with the first light source and the second light source to generate a desired color temperature and luminous level.

Figure 1:
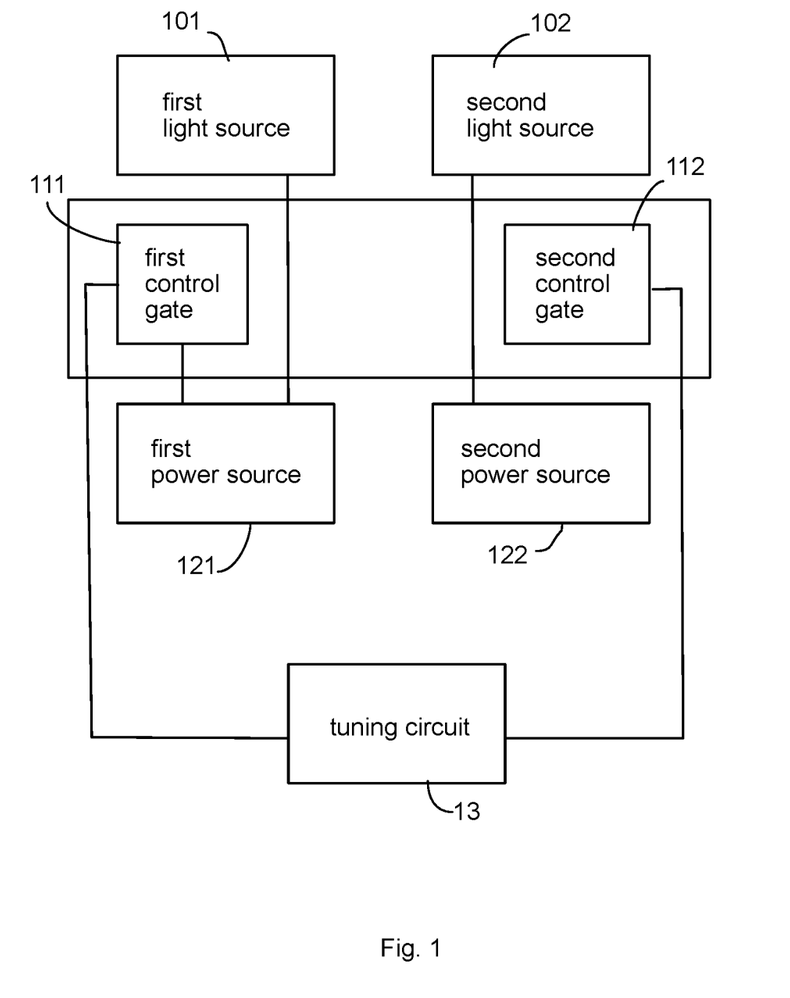
FIG. 1 is a schematic diagram of circuit structure of a first embodiment of an adjustable light apparatus.

Please refer to FIG. 1, which illustrates an adjustable light apparatus embodiment. In FIG. 1, the adjustable light apparatus includes a first light source 101, a second light source 102, a control circuit and a tuning circuit 13. The first light source 101 and the second light source 102 have different optical characteristic. For example, the first light source 101 and the second light source 102 have different color temperatures. The control circuit is coupled to the first light source 101 and the second light source 102 to separately turning on or turning off the first light source 101 and the second light source 102 according to control signals supplied by the tuning circuit 13.

Specifically, the control circuit is coupled to the first light source 101 and the second light source 102. The control circuit has a first control gate 111 and a second control gate 112 respectively connected to a first power source 121 and a second power source 122. The first power source 121 supplies power to the first light source 101 when the first control gate 111 is turned on. The second power source 122 supplies power to the second light source 102 when the second control gate 112 is turned on. The tuning circuit 13 have multiple settings corresponding to different duty cycles for turning on and turning off the first control gate 111 and the second control gate 112 to generate different mixing optical characteristic of the first light source and the second light source.

Figure 2:
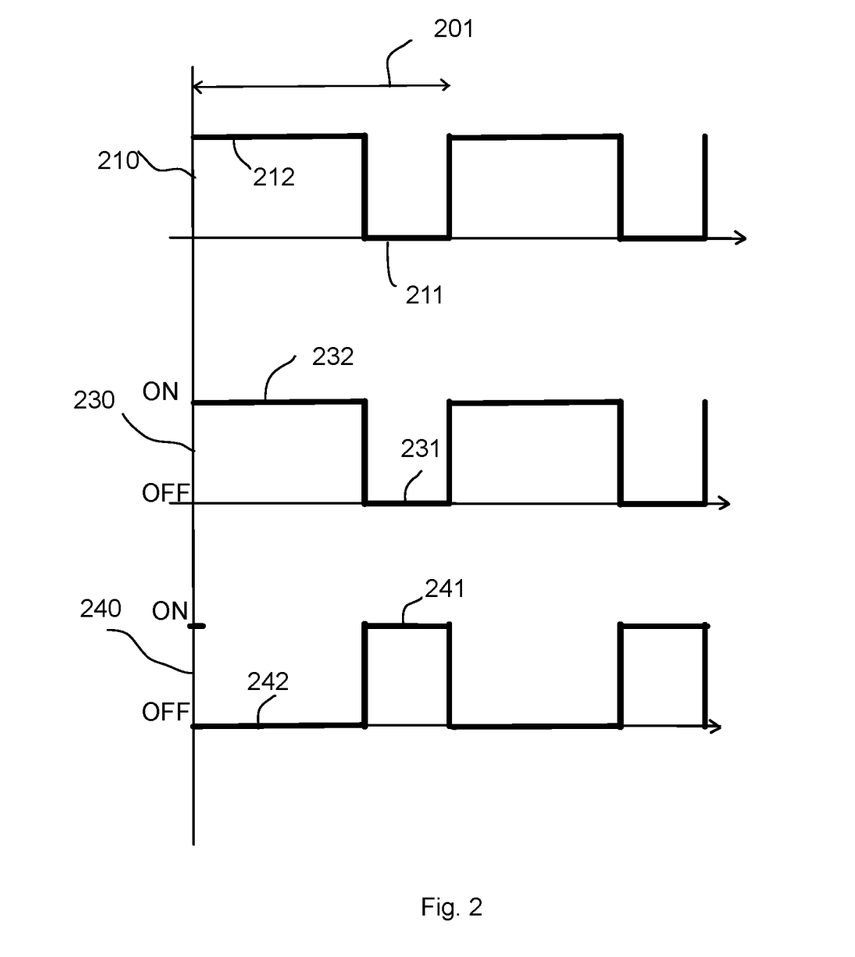
FIG. 2 illustrates a control timing diagram in a preferred embodiment using PWM.

Please refer to FIG. 2, which illustrates control timing diagram via a PWM approach. PWM, or pulse-duration modulation (PDM), is a modulation technique used to encode a message into a pulsing signal. The PWM signal is a series of pulses. For each pulse (i.e., each period or cycle), the pulse includes a portion of "high" signal and a portion of "low" signal. In one embodiment, the time period may be $\frac{1}{1000}$ second between two consecutive high levels of the PWM signal.

In FIG. 2, the PWM signal 210 is a square wave with a time period 201. The PWM signal has a high level 212 and a low level 211, with respect to electrical voltage level. The PWM signal 210 is used for generating a first control signal 230 and a second control signal 240. The first control signal 230 is used for turning on and turning off the first light source. The second control signal 240 is used for turning on and turning off the second light source. It is indicated in FIG. 2 that when the PWM signal 210 is at high level 210, the first control signal 230 sends a turn-on signal 232 to turn on the first light source. When the PWM signal 210 is at low level 211, the first control signal 230 sends a turn-off signal 231 to the first light source to turn off the first light source. On the other hand, when the PWM signal 210 is at high level 210, the second control signal 240 sends a turn-off signal 242 to turn off the second light source. When the PWM signal 210 is at low level 211, the second control signal 240 sends a turn-on signal 241 to the second light source to turn on the second light source.

Please be noted that the first power source and the second power source may be two distinct power sources but may also refer to two parts of one physical power source. In addition, the first power source and the second power source may even be referred to the same power source. In one embodiment, for example, the first light source and the second light source are not turned on at the same time. In other words, for any moment, only one light source is turned on and therefore a single power source may be used as the first power source and the second power source alternatingly.

In one embodiment, the first light source and the second light source are LED (Light Emitted Diode) modules, e.g. a LED chip or a module with multiple LED chips. The first light source and second light source may have different color temperatures. By adjusting the turn-on to turn-off ratio of the first light source corresponding to the second light source therefore may change the visual effect of mixing color temperature. Color mixing may also be used with the technical solutions mentioned in this disclosure.

In one embodiments, the first light source and the second light source respectively have multiple LED modules arranged with an interlaced pattern to each other so that when the first light source and the second light source may provide a more stable mixing effect.

In one embodiment, the first control gate and the second control gate are MOSFET switches respectively receiving a first control signal and a second control signal from the tuning circuit to turn on or to turn off the first light source and the second light source.

In one embodiment, when the first light source is turned on, the second light source is turned off. In addition, when the second light source is turned on the first light source is turned off.

In one embodiment, the first control signal and the second control signal are PWM (Pulse Width Modulation) signals provided by the tuning circuit.

In PWM case, the first control signal may refer the high level as turn-on while the second control signal may refer the low level as turn-on. In addition, the first control signal may refer the low level as turn-off while the second control signal may refer the high level as turn-off. By disposing an inverter or related circuit, the first control signal and the second control signal may have the same signal source, e.g. a PWM signal. Please be noted, however, such configuration is only one of the methods to implement the present invention and therefore, the present invention is not limited by such implementation.

In one embodiment, there are more than three settings, each setting corresponding to a different duty cycle with different turn-on by turn-off ratios for the first control signal and the second control signal. For example, the tuning circuit has a switch selectively connected to one of five resistors to construct one of five selective electrical signal values to generate a corresponding PWM signal from five options to control the first light source and the second light source. In such example, there are five settings, which means the first light source and the second light source may be controlled to generate five different optical characteristics, e.g. five different color temperatures.

Figure 3:
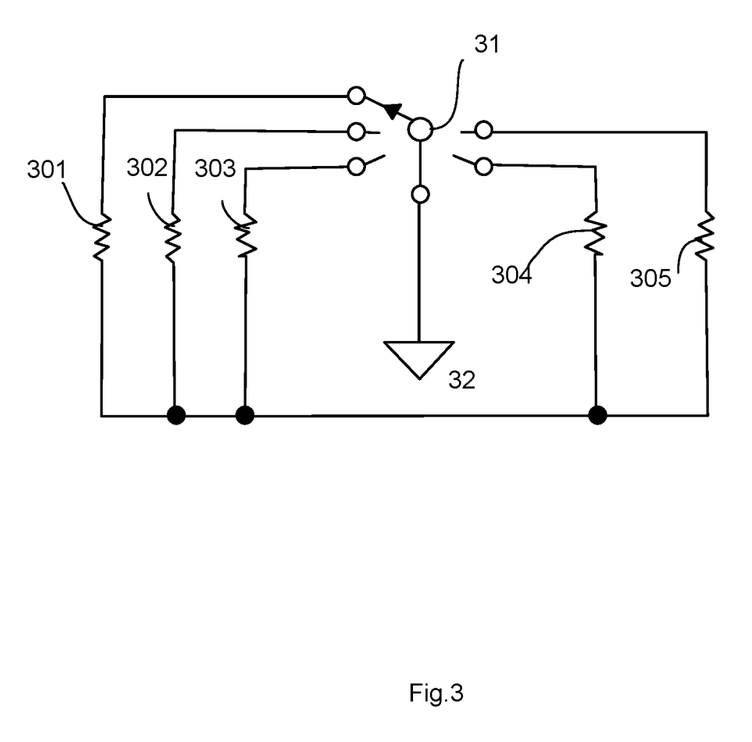
FIG. 3 illustrates a switch for providing five settings in an adjustable light apparatus.

Please refer to FIG. 3, which illustrates a portion of a driving circuit in a light apparatus. Since persons of ordinary skilled in the art know how to implement a common light apparatus driver, common circuits are not mentioned here for simplicity.

In FIG. 3, the switch 31, which may be a digital or a mechanical device for selectively connecting to five different resistors 301, 302, 303, 304, 305 to generate different signal value to supply to a tuning circuit 32.

Figure 4:
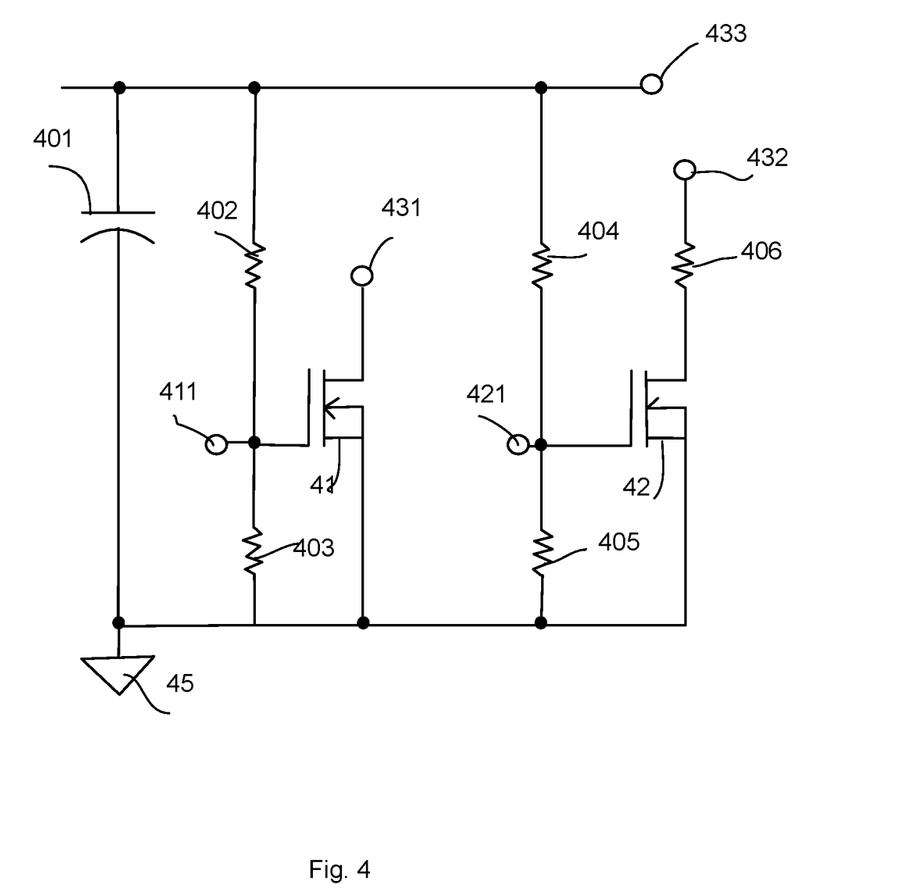
FIG. 4 illustrates a partial circuit diagram for implementing the control and power supply functions.

FIG. 4 illustrates a circuit example, not to limit the present invention but used for explaining at least one way to implement the inventive concept.

In FIG. 4, several passive components 401, 402, 403, 404, 405, 406 are used together with two MOSFET gates 41 and 42. The two MOSFET gates 41, 42 receives two control signals 411, 421, as mentioned above to turn on or turn off power source to a first light source and a second light source. In FIG. 4, the nodes 431, 432 are selectively connected to 433 to select one of the first light source and the second light source to get power supply to turn on. The circuits in FIG. 4 is further connected to other portion of a driver circuit 45 to complete the driving function.

Figure 5:
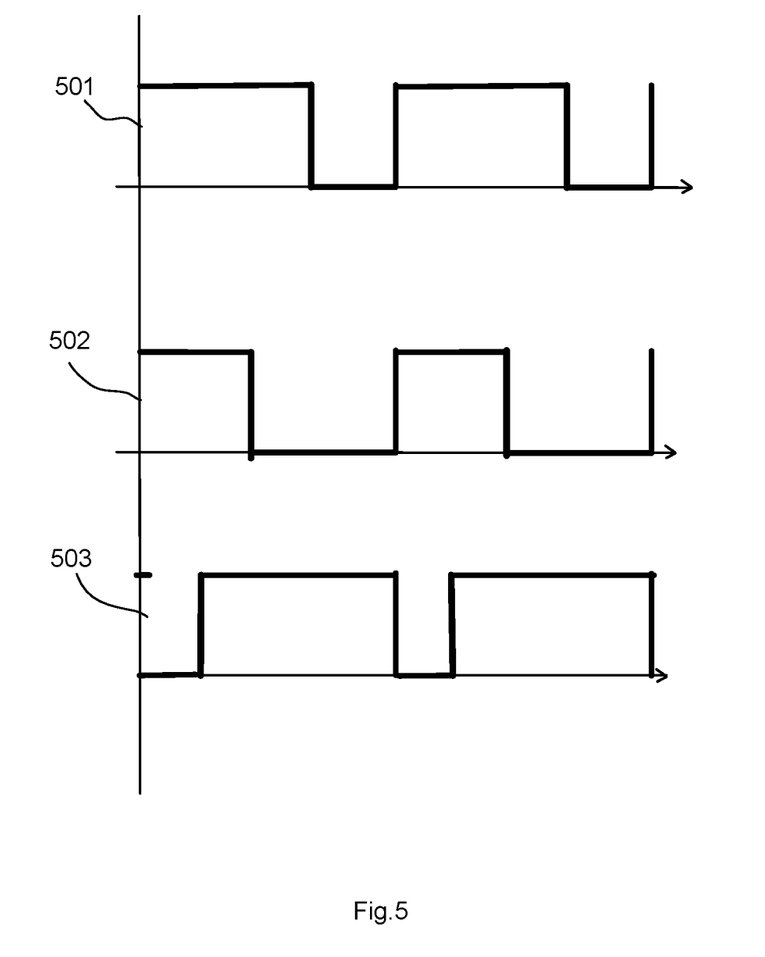
FIG. 5 illustrates three different settings under PWN signals.

Please refer to FIG. 5, which illustrate three settings in a PWM driven example of an adjustable light apparatus.

In FIG. 5, three PWM signals 501, 502, 503 having different high level to low level ratios. As mentioned above, such settings may cause different turn-on ratios between the first light source and the second light source.

Please be noted that the example is not used to limit the present invention. Persons of ordinary skilled in the art may amend the design for implementing the present invention. For example, turn-on and turn-off switching between the first light source and the second light source may depend on rising and falling edges of a periodic signal. Alternatively, the numbers of a periodic wave may be allocated respectively to turn on the first light source and the second light source. Specifically in such example, two high levels may be allocated to turn on the first light source while another consecutive four high levels may be allocated to turn on the second light source. Other variations, under such teaching, are supposed to be understood and enabling for persons of ordinary skilled in the art.

In some other embodiments, the tuning of the setting may be continuous, instead of selection from several discrete options. For example, a dimmer, e.g. along with an adjustable resistor, may be used to generate a corresponding voltage provided to a PWM generator to generate an associated PWM signal over a continuous range.

In one embodiment, the adjustable light apparatus may include an operation switch sending a tuning operation of a user to the tuning circuit to change the mixing optical characteristic of the first light source and the second light source. For example, a dimmer that is operable by a user may be used to select a setting, and the dimmer, like a rotatable button, may be connected to the tuning circuit to change the setting of driving the first light source and the second light source.

In addition to the first light source and the second light source, in other embodiments, there may be other light sources disposed. For example, a third light source, or even more, may be disposed along with the first light source and the second light source. In such case, the first light source, the second light source, and the third light source may have different color temperatures. Under different settings, the first light source, the second light source and the third light source may be turned sequentially with different time period ratios to generate a different overall color temperature.

In one embodiment, the adjustable light apparatus has a downlight housing for disposing the first light source, the second light source, the control circuit and the tuning circuit. Such downlight housing may include a reflector, a heat sink, a driver circuit, and other corresponding components to be installed on a ceiling cavity. On such housing, there may be a mechanic switch, e.g. an adjustable lever, for a user to slide to set a corresponding setting for generating a different optical characteristic, e.g. a different color temperature. Such mechanic switch may be combined with associated components to instruct the tuning circuit to change the settings of the tuning circuit.

Figure 6:
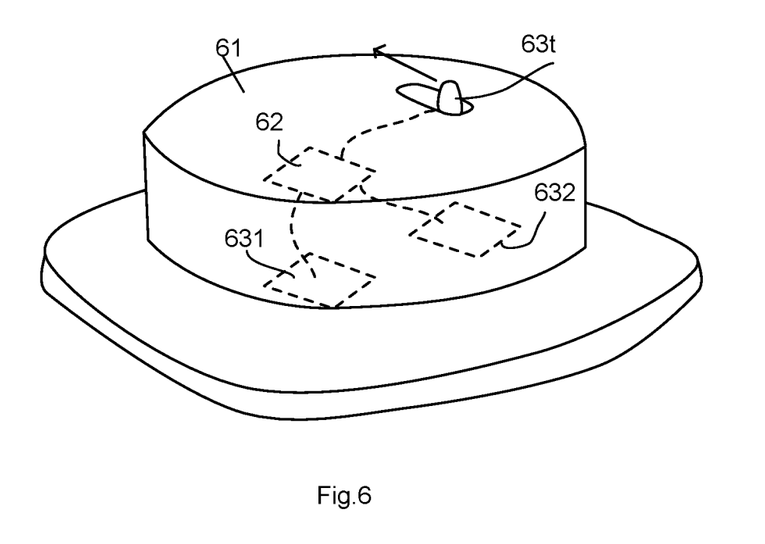
FIG. 6 illustrates a downlight embodiment that is adjustable.

Please refer to FIG. 6, which illustrates a downlight device as an embodiment of the present invention. In FIG. 6, an lever 631 may be moved by a user to change the setting of the tuning circuit 62 to change how to switch between a first light source 631 and a second light source 632.

In one embodiment, the adjustable light apparatus has a wireless circuit connected to the tuning circuit for receiving a control instruction from an external device to change the setting of the tuning circuit. For example, a user may use a Wi-Fi device or a Bluetooth device on a mobile phone to send a control signal to the wireless circuit of the adjustable light apparatus to control the tuning circuit to change a desired setting to get a desired overall optical characteristic of the adjustable light apparatus.

In one embodiment, the tuning circuit and the control circuit are integrated in an integrated chip mounted on a circuit board connected to a heat sink. These circuits may generate massive heat and such arrangement may help lengthen the life span and increase system liability.

As mentioned above, there may be more than one optical characteristic to be mixed. For example, the optical characteristic may include color spectrum distribution. In other words, the first light source and the second light source may emit different light colors. By adjusting their turn-on and turn-off ratio may be used to generate a different color effect. In addition to color, luminance strength may also be a factor to be adjusted. For example, the first light source and the second light source may have different luminance levels, e.g. one emits brighter and consumes more power than the other. By adjusting to different settings, users may easily get the desired light effect they need.

In one embodiment, the turn-on periods of the first light source and the second light source are partially overlapped. In such case, the first light source and the second light source may have a common turn-on period instead of a strict alternating pattern. Such design may increase a better visual effect. In such design, certain capacitor may be used to store the increased power source to keep the overall power source not varying too much.

In one embodiment, there may be a time gap between turn-on periods of the first light source and the second light source. For example, when the first light source is turned off, there is a time gap before the second light source is turned on. Such time gap may help keep the power source stable, avoiding undesired peak to damage the power circuit.

In one embodiment, the settings are stored in a table of the tuning circuit and the table is adjustable. For example, the tuning circuit has a corresponding memory unit for storing optional values of the settings. A designer may change the values of the memory unit to change a different value. In such design, a common configuration may have better flexibility. For example, light apparatuses sold to different regions, having different needs and requirements, may use the same hardware settings but loaded with different setting values.

In one embodiment, the first light source and the second light source may not need to be always turned on and then turn off sequentially. For example, the first light source may be kept turned on. By changing the turn-on periods of the second light source, the overall optical characteristic, like color temperature, may still be adjusted under different settings.

In one embodiment, when one of the first light source and the second light source is damaged, the other light source may be kept turned on. In other words, the other light source may be used a redundant backup solution even when one light source is damaged. In such design, an operable switch or an automatic sensor may be used for the tuning circuit to operate under predetermined circuit logic.

In addition to the above-described embodiments, various modifications may be made, and as long as it is within the spirit of the same invention, the various designs that can be made by those skilled in the art are belong to the scope of the present invention.

The invention claimed is:

1. A LED light apparatus, comprising:
a first light source for emitting a first light of a first color temperature;
a second light source for emitting a second light of a second color temperature;
a PWM generator for generating a PWM signal according to a duty ratio setting for adjusting a duty ratio of the PWM signal;
a control signal generator for generating a first control signal and a second control signal based on the PWM signal, wherein when the first control signal is in a high level, the second control signal is in a low level and when the first control signal is in the low level, the second control signal is in the high level, the first control signal is used for turning on the first light source when the first control signal is in the high level, and the second control signal is used for turning on the second light source when the second control signal is in the high level; and
a manual switch for a user to operate to change the duty ratio setting of the PWM generator for adjusting a mixed color temperature; and
a current source for alternatively supplying a first current and a second current to the first light source and the second light source respectively.

2. The LED light apparatus of claim 1, wherein the first light source and the second light source are placed in the same light source plate.

3. The LED light apparatus of claim 1, wherein the first light source and the second light source are disposed on at least one elongated substrate.

4. The LED light apparatus of claim 3, wherein the elongated substrate is flexible.

5. The LED light apparatus of claim 1, wherein the manual switch is a mechanical switch with multiple positions corresponding to multiple duty ratio settings to be selected by a user.

6. The LED light apparatus of claim 5, wherein there are five positions to be selected corresponding to five different duty ratio settings.

7. The LED light apparatus of claim 5, wherein the mechanical switch is a wheel switch.

8. The LED light apparatus of claim 5, wherein the mechanical switch is a button for sequentially changing to a different duty ratio setting click by click.

9. The LED light apparatus of claim 5, further comprising a bulb cap, and the manual switch is disposed to a surface of the bulb cap.

10. The LED light apparatus of claim 5, wherein the manual switch is a variable resistor supplying different resistance values corresponding to different duty ratio settings.

11. The LED light apparatus of claim 1, wherein the PWM generator and the control signal generator are integrated in an integrated circuit chip.

12. The LED light apparatus of claim 1, wherein the first control signal is set in the high level and the second control signal is set in the low level when the PWM signal is set in the high level.

13. The LED light apparatus of claim 1, wherein when the first control signal is in the high level, the first light source is turned on by supplying a first current, and when the second control signal is in the high level, the second light source is turned on by supplying a second current.

14. The LED light apparatus of claim 13, wherein the first current and the second current has substantially the same value.

15. The LED light apparatus of claim 1, further comprising a third light source with a third color temperature, the first light source, the second light source and the third light source together generate a mixed color temperature.

16. The LED light apparatus of claim 13, wherein the first current and the second current are adjustable by a second switch.

17. The LED light apparatus of claim 1, wherein the high level and the low level correspond to a high voltage level and a low voltage level respectively.

18. The LED light apparatus of claim 1, wherein the high level and the low level correspond to a low voltage level and a high voltage level respectively.

19. The LED light apparatus of claim 1, further comprising a downlight housing, the first light source and the second light source are disposed in the downlight housing and the manual switch is disposed on a back side of the downlight housing facing to a ceiling.

* * * * *